Nov. 21, 1950     F. DE FREMERY     2,530,600
RADIO DIRECTION FINDER
Filed July 2, 1946

INVENTOR.
FRANK DE FREMERY.
BY
AGENT.

Patented Nov. 21, 1950

2,530,600

UNITED STATES PATENT OFFICE 2,530,600

RADIO DIRECTION FINDER

Frank De Fremery, Eindhoven, Netherlands, assignor to Hartford National Bank and Trust Company, Hartford, Conn., as trustee Application July 2, 1946, Serial No. 680,901
In the Netherlands April 12, 1943

Section 1, Public Law 690, August 8, 1946
Patent expires April 12, 1963

13 Claims. (Cl. 343—106)

1

The invention relates to a method of determining a direction located in a determined plane by means of the angle $\beta$ which the direction to be determined makes with a known direction of orientation located in this plane.

For determining the azimuth on board ships, it is known to utilize two high-frequency fields which are emitted in such manner that the phase of the oscillation obtained after detection of the one field is independent of direction whereas the phase of the oscillation obtained after detection of the other field is dependent on direction whilst furthermore in one determined direction (direction of orientation) the two oscillations have the same phase. In this case the phase angle between the two oscillations obtained after detection corresponds to the azimuth.

It has also been proposed to utilize this method for the determination of the elevation.

The said known method has the drawback that the azimuth cannot be determined with great accuracy since the very exact measurement of phase angles entails difficulties.

The invention has for its object to obviate the said drawback and to provide a method of determining a direction located in a determined plane by means of the angle $\beta$ which the direction to be determined makes with a direction of orientation located in this plane, with which it is possible to attain a very great accuracy.

According to the invention, a measuring characteristic which is a measure for the angle $\beta$, is derived from the relative position of two harmonically related oscillations of different frequencies ($\omega$ and $n\omega$) which occur in the plane passing through the direction of orientation and through the direction to be determined in such manner that the two oscillations have a phase which corresponds to the angle $\beta$.

From the two oscillations is preferably derived a measuring characteristic which is proportional to sin $(n\pm 1)\beta$ or is determined by $(n\pm 1)\beta$.

A particular advantage which can be obtained with the method according to the invention, resides in that the two oscillations $\omega$ and $n\omega$ can be transmitted while being modulated on the same carrier-wave.

A detailed explanation follows with reference to the accompanying drawing forming a part of the specification and in which.

Figure 2:
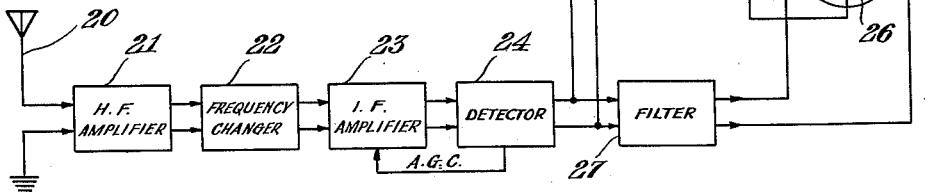
Fig. 2 is a block diagram of a receiver according to the invention.

2 on the indicating device of an embodiment of the receiver shown in Fig. 2.

Figure 1:
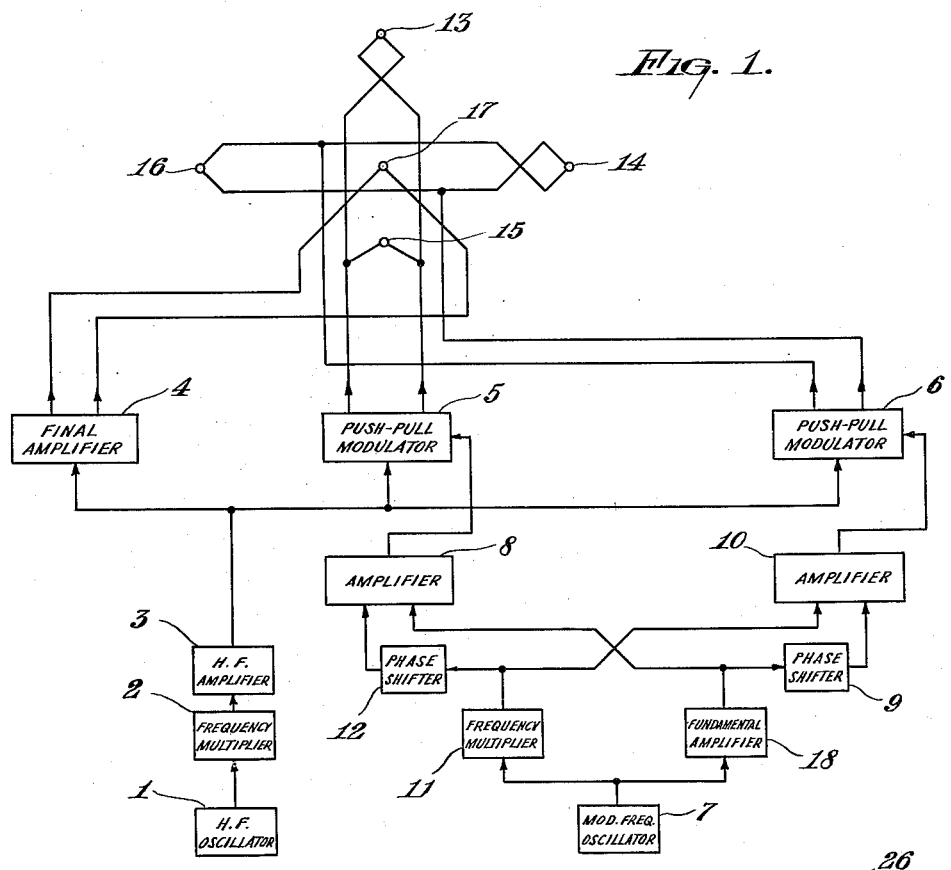
Figure 1 is a block diagram of a transmitter according to the invention.

Fig. 1 represents diagrammatically one embodiment of a beacon device suitable for carrying out the method according to the invention. In this beacon device the oscillations generated by a high-frequency oscillator 1 are supplied, as the case may be via a frequency multiplier 2 and a high-frequency amplifier 3, to a final amplification stage 4 and to two push-pull modulators 5 and 6. In these two modulators the high-frequency oscillations are modulated, with carrier-wave suppression, by two oscillations $\omega$ and $n\omega$ between which exists a harmonic relation. The modulating oscillation with the frequency $\omega$ is generated by means of an oscillator 7 and is supplied, on the one hand, via a fundamental frequency amplifier 8 and a further amplifier 8' to the modulator 5 and, on the other hand, via a phase-displacing device 9 which brings about a phase-displacement of 90°, and via an amplifier 10 to the push-pull modulator 6. The modulating oscillation with the frequency $n\omega$ is derived, by means of a frequency multiplier 11, from the oscillations generated by the oscillator 7 and is supplied, on the one hand, through a low-frequency amplifier 10' to the modulator 6 and, on the other hand, through a phase-displacing device 12 and the amplifier 8 to the modulator 5.

The beacon device according to Fig. 1 comprises furthermore four vertical dipole-aerials 13, 14, 15 and 16, which are arranged in the angular points of a square and which are perpendicular to the plane of the drawing, whilst an aerial 17 is arranged in the centre of the square and is parallel to the other aerials.

The oscillations set up in the output circuit of the final amplifier 4 are supplied to the central aerial 17 whereas the oscillations set up in the output circuits of the modulators 5 and 6 are supplied in anti-phase to the aerials 13, 15 and 14, 16 respectively which are located in the diagonal points of the square. In the preferred embodiment of the invention, the carrier wave is transmitted to the receiving devices by means of central aerial 17 in order that the advantages of suppressed carrier transmission may be secured for the radiation of the oscillations set up in the output circuits of the modulators 5 and 6.

In the above-described device the aerials arranged in the angular points of the square are consequently fed in such manner that the phase displacement between the modulated oscillations supplied to each pair of adjacent aerials is equal to the spatial angle of 90° between the two aerials, owing to which a high-frequency field modulated by the two oscillations $\omega$ and $n\omega$ is radiated in such manner that the phase of the oscillations obtained after detection is dependent on direction in a horizontal plane. With the above described antenna system, the radiation patterns of the high frequency fields will essentially be of cardioid shape; however, the exact shape of the radiation pattern is immaterial to the extent that any other radiation pattern having a directional characteristic may be employed. It is only essential that the antenna system produce a rotating radiation pattern having some directivity and that the two superimposed rotating patterns be modulated at harmonically rotating frequencies so that the phase angles between the radio frequency field in any given direction is proportional to the angle between that direction and the direction at which the fields are in phase.

By means of a phase-displacing device 12 it may be achieved that the two oscillations $\omega$ and $n\omega$ which are obtained after detection pass simultaneously through zero in a determined direction located in the said plane (direction of orientation).

In an arbitrary direction which makes an angle with the direction of orientation, there are consequently obtained after detection two oscillations of which the one is proportional to sin. $(\omega t - \beta)$ and the other is proportional to sin. $(n\omega t - \beta)$.

The angle to be determined may be derived from these two oscillations in different ways, for example by multiplying the oscillations with the lowest frequency which is obtained after detection, $n$ times in frequency, owing to which we obtain an oscillation which is proportional to sin $(n\omega t - n\beta)$. By determining the phase angle between the oscillation multiplied in frequency and the oscillation with the highest frequency which is obtained after detection and which is proportional to sin $(n\omega t - \beta)$ we obtain a measuring characteristic which is determined by $(n-1)\beta$ whereas with the known measuring method the angle $\beta$ was measured.

With the same measuring equipment we consequently obtain a larger deflection.

It is true that in measuring small angles $\beta$ with the aid of the known measuring equipments it would be possible in some cases to obtain the same indication with the use of an amplifier with the amplification factor $n-1$, but this entails the drawback that after having passed through the angle $$\frac{360°}{n-1}$$

the pointer leaves the scale whereas with the device according to the invention the pointer, after having passed through the angle $$\frac{360°}{n-1}$$

automatically returns to the starting point.

One form of construction of a receiving device suitable for the reception of oscillations transmitted by the device according to Fig. 1 is represented, by way of example, in Fig. 2. In this receiving device the modulated oscillations received by an aerial 20 are supplied to a high-frequency amplifier 21 which is connected in cascade with a frequency changer 22, an intermediate-frequency amplifier 23 and a detector 24.

Figure 3:
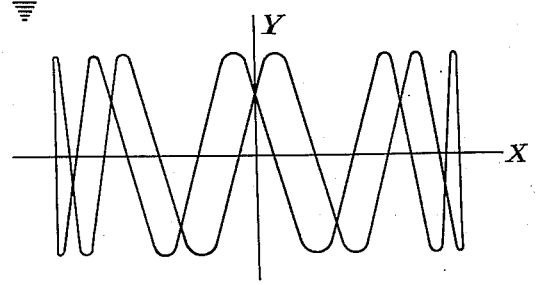
Fig. 3 is a diagram of an indication produced

Preferably, an automatic gain control voltage is derived from detector 24 and is applied to intermediate-frequency amplifier 23 in order to obtain an indication which is independent of the amplitude of the incoming signal, although this feature may be omitted if it is not desired. Also, it is preferable that intermediate-frequency amplifier 23 be designed to incorporate a limiting feature as well as to provide the necessary gain at intermediate frequency. In the output circuit of the detector are obtained two oscillations, of which the one is proportional to sin $(\omega t - \beta)$ and the other is proportional to sin $(n\omega t - \beta)$. For deriving the angle $\beta$ from these two oscillations use is made in the form of construction shown in Fig. 2 of a cathode-ray tube 29 which comprises two deflecting members 26, 28 which bring about a deflection of the beam in two mutually perpendicular directions, the two received oscillations being supplied to the said two deflecting members respectively. The oscillations with the highest frequency $(n\omega)$ which are set up in the output circuit of the detector 24 are supplied via a filter 25 to deflecting plates 26 whereas the oscillations with the frequency $\omega$ are supplied via a filter 27 to horizontal deflecting plates 28 of cathode-ray tube 29. In this way there is produced on the screen of the cathode-ray tube a stationary Lissajous-figure whose X-axis is proportional to sin $(\omega t - \beta)$ whereas the Y-axis is proportional to sin $(n\omega t - \beta)$. One example of such a Lissajous-figure is shown in Fig. 3, this figure being obtained in a direction to be determined if $n=8$.

The ordinate of the point of intersection of the Lissajous-curve and the Y-axis, which indicates the instantaneous value of the oscillations with the frequency $n\omega$ at the moment when the oscillation with the frequency $\omega$ passes through zero, yields a measuring characteristic which is proportional to sin $(n-1)\beta$ and which is consequently a measure for the angle $\beta$, for if, $$X = A \sin (\omega t - \beta) = 0,$$

then is also $$\sin n (\omega t - \beta) = 0$$
$$\cos (\omega t - \beta) = 1$$

and $$\cos n (\omega t - \beta) = 1$$

It follows therefrom that $$Y = B \sin (n\omega t - \beta) = B \sin \{(n\omega t - n\beta + (n-1)\beta\} = B \sin n(\omega t - \beta) \cos (n-1) \beta + B \cos n (\omega t - \beta) \sin (n-1)\beta = B \sin (n-1)\beta$$

If the equipment is adjusted in such manner that $B=1$, the ordinate of the point of intersection of the Lissajous curve and the Y-axis is a direct measure for the angle $(n-1)\beta$.

In the direction of orientation in which the two oscillations $\omega$ and $n\omega$ pass simultaneously through zero, sin $(n-1)\beta$ is equal to zero and $\beta$ is equal to 0. For $$\beta = \frac{90°}{n-1}$$

the maximum value of the measuring characteristic is attained, whereupon with the increase of $\beta$ the measuring characteristic decreases to a minimum value and then, when $$\beta = \frac{360°}{n-1}$$

attains again the value 0 occurring in the direction of orientation, owing to which the device returns automatically to the starting point, which is repeated each time with the increase of $\beta$ after $$\beta = \frac{360°}{n-1}$$

If with the method according to the invention a high factor $n$ is utilized, a proper deflection is obtained even when determining directions which include a small angle $\beta$ with the direction of orientation, so that the angle $\beta$ can be determined with great accuracy.

With the above-described device there were obtained two oscillations with harmonically related frequencies which were proportional to sin $(\omega t - \beta)$ and to sin $(n\omega t - \beta)$ respectively, since with the transmitting device described with reference to Fig. 1 both for the oscillations with the frequency $\omega$ and for the oscillations with the frequency $n\omega$ the aerials 13 to 16 are fed in such manner that the current in the aerial 13 leads with respect to the currents in the other aerials. If, however, the phase-displacing devices 9 and 12 are provided in such manner that, for example, for the frequency $\omega$ the current in the aerial 13 leads and for the frequency $n\omega$ lags behind with respect to the currents in the other aerials, we obtain after detection two oscillations which are proportional to sin $(\omega t - \beta)$ and to sin $(n\omega t + \beta)$ respectively. From the relative position of the two oscillations may be derived in this case a measuring characteristic which either is determined by $(n+1)\beta$ or is proportional to sin $(n+1)\beta$ since sin $(n\omega t+\beta)$ may be represented by $\{\sin n(\omega t - \beta) + (n+1)\beta\}$.

What I claim is:

1. A method of establishing a bearing by radio means, comprising the steps of radiating a first radio frequency field of a predetermined pattern modulated at a given frequency and rotating at the angular velocity of said given frequency, radiating a second radio frequency field of the same pattern modulated at a second frequency harmonically related to said given frequency and rotating at the angular velocity of said second frequency, and synchronizing said rotating radio frequency fields to provide an in-phase relationship in a given azimuthal direction whereby said bearing with respect to said given azimuthal direction is established proportional to the phase difference between said first and said second radio frequency fields.

2. A method of establishing a bearing by radio means, comprising the steps of radiating a first radio frequency field of a predetermined pattern modulated at a given frequency and rotating at the angular velocity of said given frequency, radiating a second radio frequency field of the same pattern modulated at a second frequency harmonically related to said given frequency and rotating at the angular velocity of said second frequency, and synchronizing said rotating radio frequency fields to provide an in-phase relationship in a given azimuthal direction whereby said bearing with respect to said given azimuthal direction is proportional to the arc sine of the phase angle between said first and said second radio frequency fields divided by the quantity $(n \pm 1)$ where $n$ is the order of the harmonic relationship of the modulating frequencies.

3. A method of establishing a bearing by radio means, comprising the steps of radiating a first radio frequency field of a cardioid pattern modulated at a given frequency and rotating at the angular velocity of said given frequency, radiating a second radio frequency field of a cardioid pattern modulated at a second frequency harmonically related to said given frequency and rotating at the angular velocity of said second frequency, and synchronizing said rotating radio frequency fields to provide an in-phase relationship in a given azimuthal direction whereby said bearing with respect to said given azimuthal direction is equal to the phase angle between said first and said second radio frequency fields divided by the factor $(n \pm 1)$ where $n$ is the order of the harmonic relationship of the modulating frequencies.

4. A method of establishing a bearing by radio means, comprising the steps of radiating a first radio frequency field of a predetermined pattern modulated at a given frequency and rotating at the angular velocity of said given frequency, radiating a second radio frequency field of the same pattern modulated at a second frequency harmonically related to said given frequency and rotating at the angular velocity of said second frequency and in the same direction as said first radio frequency field, and synchronizing said rotating radio frequency fields to provide an in-phase relationship in a given azimuthal direction whereby said bearing with respect to said given azimuthal direction is equal to the phase angle between said first and said second radio frequency fields divided by the factor $(n-1)$ where $n$ is the order of harmonic relationship of the modulating frequencies.

5. A method of establishing a bearing by radio means, comprising the transmission of radio signals providing an indication of said bearing comprising the steps of radiating a first radio frequency field of a predetermined pattern modulated at a given frequency and rotating at the angular velocity of said given frequency, radiating a second radio frequency field of the same pattern modulated at a second frequency harmonically related to said given frequency and rotating at the angular velocity of said second frequency, and synchronizing said rotating radio frequency fields to provide an in-phase relationship in a given azimuthal direction whereby said bearing with respect to said given azimuthal direction is established proportional to the phase difference between said first and said second radio frequency fields, and the detection of said radio signals comprising the steps of receiving said signals, rectifying said signals, filtering the rectified component of said signals to produce a first voltage having amplitude variations corresponding to said first modulating frequency and a second voltage having amplitude variations corresponding to said harmonic modulating frequency, and measuring the phase angle between said first and said second voltages thereby determining said bearing.

6. A method of establishing a bearing by radio means, comprising the transmission of radio signals providing an indication of said bearing comprising the steps of radiating a first radio frequency field of a predetermined pattern modulated at a given frequency and rotating at the angular velocity of said given frequency, radiating a second radio frequency field of the same pattern modulated at a second frequency harmonically related to said given frequency and rotating at the angular velocity of said second frequency, and synchronizing said rotating radio frequency fields to provide an in-phase relationship in a given azimuthal direction whereby said bearing with respect to said given azimuthal difection is established proportional to the phase difference between said first and said second radio frequency fields, and the detection of said radio signals comprising the steps of receiving said signals, rectifying said signals, filtering the rectified component of said signals to produce a first voltage having amplitude variations corresponding to said first modulating frequency and a second voltage having amplitude variations corresponding to said harmonic modulating frequency, and measuring the instantaneous amplitude of said second voltage at the time when the instantaneous amplitude of said first voltage passes through zero thereby determining said bearing.

7. A method of establishing a bearing by radio means, comprising the transmission of radio signals providing an indication of said bearing comprising the steps of radiating a first radio frequency field of a predetermined pattern modulated at a given frequency and rotating at the angular velocity of said given frequency, radiating a second radio frequency field of the same pattern modulated at a second frequency harmonically related to said given frequency and rotating at the angular velocity of said second frequency, and synchronizing said rotating radio frequency fields to provide an in-phase relationship in a given azimuthal direction whereby said bearing with respect to said given azimuthal direction is established proportional to the phase difference between said first and said second radio frequency fields, and detection of said radio signals comprising the steps of receiving said signals, rectifying said signals, filtering the rectified component of said signals to produce a first voltage having amplitude variations corresponding to said first modulating frequency and a second voltage having amplitude variations corresponding to said harmonic modulating frequency, and producing an oscillogram of said first and said second voltages at a phase displacement of 90° thereby providing a direct indication of said bearing.

8. A transmitter for establishing a bearing by radio means comprising means to generate a first and a second oscillation of predetermined frequency value, means to modulate said first oscillation by a given frequency, means to modulate said second oscillation by a second frequency harmonically related to said given frequency, means responsive to said first modulated oscillation and said second modulated oscillation to produce directional radio frequency fields radiating into space and rotating at angular velocities corresponding to the respective modulating frequencies, and means to shift the phase relationship of said first and said second modulating frequencies to produce an in-phase relationship of said rotating radio frequency fields in a given azimuthal direction thereby to establish said bearing with respect to said azimuthal direction as the phase angle between said given frequency and said harmonically related frequency.

9. A transmitter for establishing a bearing by radio means comprising means to generate a first and a second oscillation of predetermined frequency value, means to modulate said first oscillation by a given frequency, means to modulate said second oscillation by a second frequency harmonically related to said given frequency, means responsive to said first modulated oscillation and said second modulated oscillation to produce directional radio frequency fields radiating into space and rotating at angular velocities corresponding to the respective modulating frequencies, and means to shift the phase relationship of said first and said second modulating frequencies to produce an in-phase relationship of said rotating radio frequency fields in a given azimuthal direction, said radio frequency fields occurring in a plane passing through said given azimuthal direction and said bearing, thereby to establish said bearing with respect to said azimuthal direction as the phase angle between said given frequency and said harmonically related frequency.

10. A transmitter for establishing a bearing by radio means, comprising means to generate a wave of carrier frequency, means to generate an oscillation of a given frequency, means to generate a second oscillation of a frequency harmonically related to said given frequency, a first phase shifting circuit element, means to apply said second oscillation to said first phase shifting circuit element, a first balanced modulator, means to apply said carrier wave, said first oscillation and the output of said first phase shifting circuit element to said balanced modulator to suppress said carrier wave and generate side-band frequencies corresponding to said first oscillation and said phase-shifted harmonic oscillation, a second phase shifting circuit element, means to apply said given oscillation to said second phase shifting element, a second balanced modulator, means to apply said carrier wave, said harmonic oscillation and the output of said second phase shifting circuit element to said second balanced modulator to suppress said carrier wave and produce side-band frequencies corresponding to said harmonic oscillation and the phase-shifted given oscillations, an antenna system including first and second spaced pairs of radiators, said first pair being perpendicularly disposed with respect to said second pair, means to couple said first and said second balanced modulators in phase opposition to the radiators of said first and second pairs respectively of said antenna system to radiate into space two rotating directional radio frequency fields having a phase relationship therebetween, and means to adjust said first phase shifting circuit element to produce an in-phase relationship of said rotating radio frequency fields in a given azimuthal direction thereby to establish said bearing with respect to said given azimuthal direction proportional to the phase angle between said rotating radio frequency fields.

11. A transmitter for establishing a bearing by radio means, comprising an antenna system having a central radiator and a plurality of pairs of diametrically opposed cooperating radiators symmetrically arranged around said central radiator, means to generate a wave of carrier frequency, means to apply said wave to said central radiator to transmit said carrier frequency wave omnidirectionally, means to generate an oscillation of a given frequency, means to generate a second oscillation of a frequency harmonically related to said given frequency, a first phase shifting circuit element, means to apply said second oscillation to said first phase shifting circuit element, a first balanced modulator, means to apply said carrier wave, said first oscillation and the output of said first phase shifting circuit element to said first balanced modulator to suppress said carrier wave and generate side-band frequencies corresponding to said first oscillation and said phase-shifted harmonic oscillation, means to couple said first balanced modulator in phase opposition to the radiators of the first pair of said plurality of pairs of cooperating radiators, a second phase shifting circuit element, means to apply said given oscillation to said second phase shifting element, a second balanced modulator, means to apply said carrier wave, said harmonic oscillation and the output of said second phase shifting circuit element to said second balanced modulator to suppress said carrier wave and produce side-band frequencies corresponding to said harmonic oscillation and the phase-shifted given oscillation, means to couple said second balanced modulator in phase opposition to the radiators of the second pair of said pairs of cooperating radiators, thereby to radiate into space two directional radio frequency fields rotating about the locus of said central radiator and having a phase relationship therebetween, and means to adjust said first phase shifting circuit element to produce an in-phase relationship of said rotating radio frequency fields in a given azimuthal direction thereby to establish said bearing with respect to said given azimuthal direction proportional to the phase angle between said rotating radio frequency fields.

12. A receiver for determining a bearing transmitted by radio signals having values proportional to the phase angle between a first radio frequency field modulated at a given frequency and rotating at the angular velocity of said given frequency and a second radio frequency field modulated at a second frequency harmonically related to said given frequency and rotating at the angular velocity of said second frequency, said rotating radio frequency fields being synchronized to provide an in-phase relationship in a given azimuthal direction, comprising means to receive said signals, means to detect said signals, means responsive to said detected signals to produce a first voltage having amplitude variations corresponding to said first modulating frequency and a second voltage having amplitude variations corresponding to said harmonic modulating frequency, a cathode ray tube having horizontal and vertical deflection elements, means to apply said first voltage to the horizontal deflecting elements of said cathode ray tube, and means to apply said second voltage to the vertical deflection elements of said cathode ray tube, thereby to determine said bearing.

13. A receiver for determining a bearing transmitted by radio signals having values proportional to the phase angle between a first radio frequency field modulated at a given frequency and rotating at the angular velocity of said given frequency and a second radio frequency field modulated at a second frequency harmonically related to said given frequency and rotating at the angular velocity of said second frequency, said rotating radio frequency fields being synchronized to provide an in-phase relationship in a given azimuthal direction, comprising means to receive said signals, means to detect said signals, means responsive to said detected signals to produce a first voltage having amplitude variations corresponding to said first modulating frequency and a second voltage having amplitude variations corresponding to said harmonic modulating frequency, a cathode ray tube having horizontal and vertical deflection elements, means to apply said first voltage to the horizontal deflecting elements of said cathode ray tube and to apply said second voltage to the vertical deflection elements of said cathode ray tube to measure the instantaneous amplitude of said second voltage at the time when the instantaneous amplitude of said first voltage at the time when the instantaneous amplitude of said first voltage passes through zero, thereby to determine said bearing directly.

FRANK DE FREMERY.

REFERENCES CITED

The following references are of record in the file of this patent:

UNITED STATES PATENTS

| Number | Name | Date |
|---|---|---|
| 1,815,246 | Englund | July 21, 1931 |
| 1,922,677 | Greig et al. | Aug. 15, 1933 |
| 2,121,024 | Diamond | June 21, 1938 |
| 2,198,113 | Holmes | Apr. 23, 1940 |
| 2,252,699 | Byrne | Aug. 19, 1941 |
| 2,253,958 | Luck | Aug. 26, 1941 |
| 2,297,395 | Erben | Sept. 29, 1942 |
| 2,377,902 | Relson | June 12, 1945 |
| 2,394,157 | Earl | Feb. 5, 1946 |
| 2,422,110 | Luck | June 10, 1947 |
| 2,483,557 | O'Brien | Oct. 4, 1949 |